(12) United States Patent
Richardson et al.

(10) Patent No.: US 7,964,138 B2
(45) Date of Patent: Jun. 21, 2011

(54) ON-DEMAND PORTABLE CHLORINE DIOXIDE GENERATOR

(75) Inventors: David E. Richardson, Gainesville, FL (US); Daniel Denevan, Gainesville, FL (US); Dwight C. Ramdon, Kingston (JM)

(73) Assignee: University of Florida Research Foundation, Inc., Gainesville, FL (US)

( * ) Notice: Subject to any disclaimer, the term of this patent is extended or adjusted under 35 U.S.C. 154(b) by 143 days.

(21) Appl. No.: 12/095,388

(22) PCT Filed: Nov. 29, 2006

(86) PCT No.: PCT/US2006/061335
§ 371 (c)(1),
(2), (4) Date: May 29, 2008

(87) PCT Pub. No.: WO2007/065103
PCT Pub. Date: Jun. 7, 2007

(65) Prior Publication Data
US 2008/0292534 A1      Nov. 27, 2008

Related U.S. Application Data

(60) Provisional application No. 60/740,393, filed on Nov. 29, 2005, provisional application No. 60/780,257, filed on Mar. 8, 2006.

(51) Int. Cl.
*C01B 11/02* (2006.01)

(52) U.S. Cl. ............ 422/29; 422/37; 422/120; 422/236; 422/305; 422/501; 423/477; 210/673

(58) Field of Classification Search ................ 423/477; 210/673; 422/29, 37, 100, 236, 305
See application file for complete search history.

(56) References Cited

U.S. PATENT DOCUMENTS

| 3,684,437 | A |   | 8/1972 | Callerame |
| 4,247,531 | A | * | 1/1981 | Hicks ............................ 423/477 |

(Continued)

FOREIGN PATENT DOCUMENTS

CA         2479215         2/2003

(Continued)

OTHER PUBLICATIONS

Griffith, "The Bromine-bromide-tribromide equilibrium", p. 8.*

*Primary Examiner* — Jill Warden
*Assistant Examiner* — Shogo Sasaki
(74) *Attorney, Agent, or Firm* — Saliwanchik, Lloyd & Eisenschenk

(57) ABSTRACT

An on-demand portable chlorine dioxide generator has a reagent bound medium in a first enclosed volume; a complementary reagent solution in a second enclosed volume, and a structure for selecting between a first position where the complementary reagent solution is forced through the reagent bound medium and a second position where said complementary reagent solution remains isolated from the reagent bound ion exchange medium, where a ClO2 solution is generated only during periods when the structure for forcing is actuated. The ClO2 solution can be discharged for use as a portable sprayer that can be used to treat surfaces infected by anthrax or other biological contaminants. When the bound reagent is chlorite, the complementary reagent is an acid or an oxidant. When the bound reagent is an acid or an oxidant, the complementary reagent solution is a chlorite solution.

24 Claims, 5 Drawing Sheets

U.S. PATENT DOCUMENTS

| | | | |
|---|---|---|---|
| 4,504,442 A | 3/1985 | Rosenblatt et al. | |
| 4,681,739 A | 7/1987 | Rosenblatt et al. | |
| 4,731,192 A | 3/1988 | Kenjo et al. | |
| 4,889,654 A | 12/1989 | Mason et al. | |
| 5,197,636 A * | 3/1993 | Mitchell et al. | 222/190 |
| 6,343,476 B1 * | 2/2002 | Wang et al. | 62/46.1 |
| 6,418,965 B2 * | 7/2002 | Bryselbout | 137/606 |
| 6,494,343 B2 * | 12/2002 | McManus et al. | 222/55 |
| 6,920,904 B2 * | 7/2005 | Yquel | 141/3 |
| 6,962,268 B2 * | 11/2005 | Bruat et al. | 222/3 |
| 7,811,532 B2 * | 10/2010 | Kerr et al. | 422/305 |
| 2003/0064018 A1 | 4/2003 | Sampson et al. | |
| 2003/0077216 A1 | 4/2003 | Klatte | |
| 2003/0213521 A1 * | 11/2003 | Downie | 137/505.33 |
| 2004/0000338 A1 * | 1/2004 | Heiderman | 137/494 |
| 2004/0062680 A1 | 4/2004 | Kampa et al. | |
| 2004/0183050 A1 | 9/2004 | Hei et al. | |
| 2004/0241065 A1 | 12/2004 | Kampa et al. | |
| 2004/0253140 A1 | 12/2004 | Wagemann et al. | |
| 2005/0196337 A1 | 9/2005 | Sampson et al. | |

FOREIGN PATENT DOCUMENTS

| | | |
|---|---|---|
| EP | 0673878 | 9/1995 |

* cited by examiner

ON-DEMAND PORTABLE CHLORINE DIOXIDE GENERATOR

CROSS-REFERENCE TO RELATED APPLICATIONS

This application is a §371 national stage entry of International Application No. PCT/US2006/061335, filed Nov. 29, 2006, which claims priority to U.S. Provisional Application No. 60/780,257, filed Mar. 8, 2006, and U.S. Provisional Application No. 60/740,393, filed Nov. 29, 2005, all of which are hereby incorporated by reference.

STATEMENT REGARDING FEDERALLY SPONSORED RESEARCH OR DEVELOPMENT

This invention was made with government support under Grant No. DAAD19-01-1-0691, awarded by the Army Research Office. The government has certain rights in this invention.

FIELD OF THE INVENTION

The invention relates to on-demand chlorine dioxide generators.

BACKGROUND

The use of certain gases as sterilizing agents as bactericides, viricides and sporicides, is known. Chlorine dioxide ($ClO_2$) is one such agent and is used annually in the U.S. at a rate of approximately 4 million pounds per year, primarily for water purification as a replacement for chlorine/hypochlorite (bleach). Chlorine dioxide is an effective microbicide as a gas and in solution and also can destroy certain chemical substances and toxins. For example, U.S. Pat. Nos. 4,504,442 and 4,681,739 to Rosenblatt et al. disclose the use of chlorine dioxide gas as a chemosterilizing agent.

In addition chlorine dioxide has excellent environmental qualities, as it does not produce large quantities of chlorinated hydrocarbon byproducts. Although large-scale production of chlorine dioxide is handled effectively by chemical generator systems, typically being track mounted when portability is needed, small-scale production is more challenging. In particular, on-demand production, rapid deployment, and portability for use in personal protection are difficult to combine in a single product.

Many processes are known for the production of $ClO_2$ in gas or solution forms suitable for large-scale use. Success in the use of $ClO_2$ for domestic anthrax clean-up has amply demonstrated this point for cases where a significant amount of time is available to transport heavy equipment and chemicals to the contamination site. Usually, the sophisticated equipment needed to produce $ClO_2$ requires ample power, particularly if electrolysis is used for generation.

On the other hand, portable $ClO_2$ dispensers for immediate decontamination that could be carried by a person and used in small areas (offices, labs, clinics, etc) or transported on vehicles are not generally available. A viable working requirement is that the dispenser should be the size and function that can be easily handled by a single individual. For example the dispenser can have the form of and function similarly to a typical fire extinguisher and preferably would require no external power and work by simply opening a valve to release a decontaminant fluid with essentially no time delay. A reasonable target is the production of 1 L of decontaminant fluid with greater than 5 mM $ClO_2$ in less than 1 minute for such a portable dispenser. Furthermore, larger devices that could be portable by vehicle or dolly could also provide for immediate decontamination over larger areas, and small devices could provide personal decontamination of remote water supplies.

Moreover, chlorine dioxide solutions (chlorous oxide) in any form are highly unstable, so it is necessary to generate the solution immediately before use. Accordingly, the reaction components which when mixed together produce chlorine dioxide gas must be maintained separately until gas production is desired.

In general, chlorine dioxide solutions can be produced by treatment of chlorite salt solutions (e.g. $NaClO_2$) with an acid solution to produce acidic solutions that contain $ClO_2$. The $ClO_2$ can be used in these solutions or flushed as a gas into water to produce aqueous $ClO_2$. It is difficult to use this traditional approach to design, for example, a portable sprayer that can be used to treat surfaces infected by anthrax or other biological contaminants.

U.S. Patent Application Publication Nos. 20040241065 and 2004062680 to Kampa disclose on-demand chlorine dioxide generators, which can be portable. Kampa discloses a chlorine dioxide gas generating kit including a gas generating apparatus having a first reaction component contained therein and a second reaction component contained therein. The first and second reaction components are separated within the apparatus by at least one rupturable membrane. To activate the apparatus, the membrane is ruptured to permit contact between the first and second reaction components to facilitate a chemical reaction therebetween, which produces the chlorine dioxide gas.

The reaction components disclosed by Kampa are both liquid reagents. Liquid reagents risk leakage and require relatively large storage volumes. Moreover, chlorine dioxide production according to Kampa requires the rupture a rupturable membrane to permit contact between the reagents. Rupture of the membrane can occur inadvertently during handling or even prevent dispensing when desired. Significantly, the required rupture provides only one-shot use where the entire first reaction component is mixed with the entire second reaction component upon rupture of the membrane.

Ion exchange mediums are known for the formation of chlorous oxide. For example, U.S. Pat. No. 3,684,437 to Callerame discloses production of chlorous oxide by ion exchange between a mixed bead cation-anion exchange resin and a chlorite of an alkali metal or an alkaline earth metal with a flow rate of 1 mL/minute or less. Heating the solution formed by the ion exchange reaction liberates gaseous chlorine dioxide. Similarly, U.S. Patent Application Publication Nos. 20030064018 and 20050196337, both to Sampson et al. disclose generation of chlorous acid from a chlorite salt precursor, a chlorate salt precursor, or a combination of both by passing an aqueous solution of the precursor through a cationic ion exchange resin in a hydrogen ion form and a catalytic material to accelerate the decomposition of chlorous acid to chlorine dioxide using gravity feed and a flow rate of 30 mL/minute. Both Callerame and Sampson disclose only bulk or laboratory methods for forming chlorous oxide, with no adaptability for on-demand or portable chlorous oxide generation, where flow rates of approximately 1 L/minute or more are needed.

SUMMARY OF THE INVENTION

An on-demand $ClO_2$ generator includes a reagent bound medium in a first enclosed volume; a complementary reagent solution isolated from the reagent bound medium in a second enclosed volume; a structure for selecting between a first position where the complementary reagent solution is forced through the reagent bound medium and a second position where the complementary reagent solution remains isolated from the reagent bound medium, where $ClO_2$ (aq) is generated only during periods when the structure for forcing is actuated, and; an outlet through which a $ClO_2$ or a solution capable of spontaneously forming $ClO_2$ is discharged. The first and the second enclosed volumes can be within a single common container and the structure for forcing can be a pressure-actuated source such as a plunger, a pump, or a compress gas with one or more valves. The structure for forcing can include a check-valve or break-seal situated between the first and second volumes where the check-valve or break-seal permits flow upon actuating the structure for forcing the complementary reactant solution through the reactant bound medium. The generator can also include a basic or mixed bead ion exchange medium disposed downstream of the reagent bound ion exchange medium, to result in a near neutral or salt free $ClO_2$ solutions are discharged. The outlet can be a spray nozzle or a structure for generating an aerosol.

The reagent bound medium can be an acidic ion exchange resin and the complementary reagent solution is a chlorite solution. The reagent bound medium can be an oxidant bound medium and the complementary reagent solution can be a chlorite solution. The oxidant bound medium is a metal complex bound to a medium. The metal complex can be an iron complex. The oxidant bound medium can be a $Br_3^-$ bound ion exchange resin. The reagent bound medium can be a chlorite bound ion exchange medium and the complementary reagent solution can be an acid solution. The acid solution can be an aqueous buffer solution of pH of about 3.5 to about 5 with a buffer capacity of about 2 to about 5. The reagent bound medium can be a chlorite bound ion exchange medium and the complementary reagent solution can be an oxidant solution, such as aqueous bromine or chlorine. The oxidant solution can be generated upon forcing a salt solution in a portion of the second volume through an oxidant bound medium in a second portion of the second volume situated immediately adjacent to the chlorite bound ion exchange medium in the first volume when the structure for forcing is actuated. The oxidant bound ion exchange medium can be a tribromide bound ion exchange medium.

A method of generating $ClO_2$, comprising the steps of: providing a reagent bound medium and a complementary reagent solution isolated from one another, and switching between a position for forcing the complementary reagent solution through the reagent bound medium and a second position where the complementary reagent solution remains isolated from the reagent bound ion exchange medium, wherein $ClO_2$ (aq) is generated only during periods when a structure for forcing is actuated. The reagent bound medium can be an acidic ion exchange medium and the complementary reagent solution can be a chlorite solution. The reagent bound medium can be a chlorite bound ion exchange medium and the complementary reagent solution can be an acid solution. The reagent bound medium can be an oxidant bound ion exchange medium and the complementary reagent solution can be a chlorite solution. The reagent bound medium can be a chlorite bound ion exchange medium and the complementary reagent solution can be an oxidant solution.

BRIEF DESCRIPTION OF THE DRAWINGS

There are shown in the drawings, embodiments that are presently preferred, it being understood, however, that the invention is not limited to the precise arrangements and instrumentalities shown.

DETAILED DESCRIPTION

Figure 1:
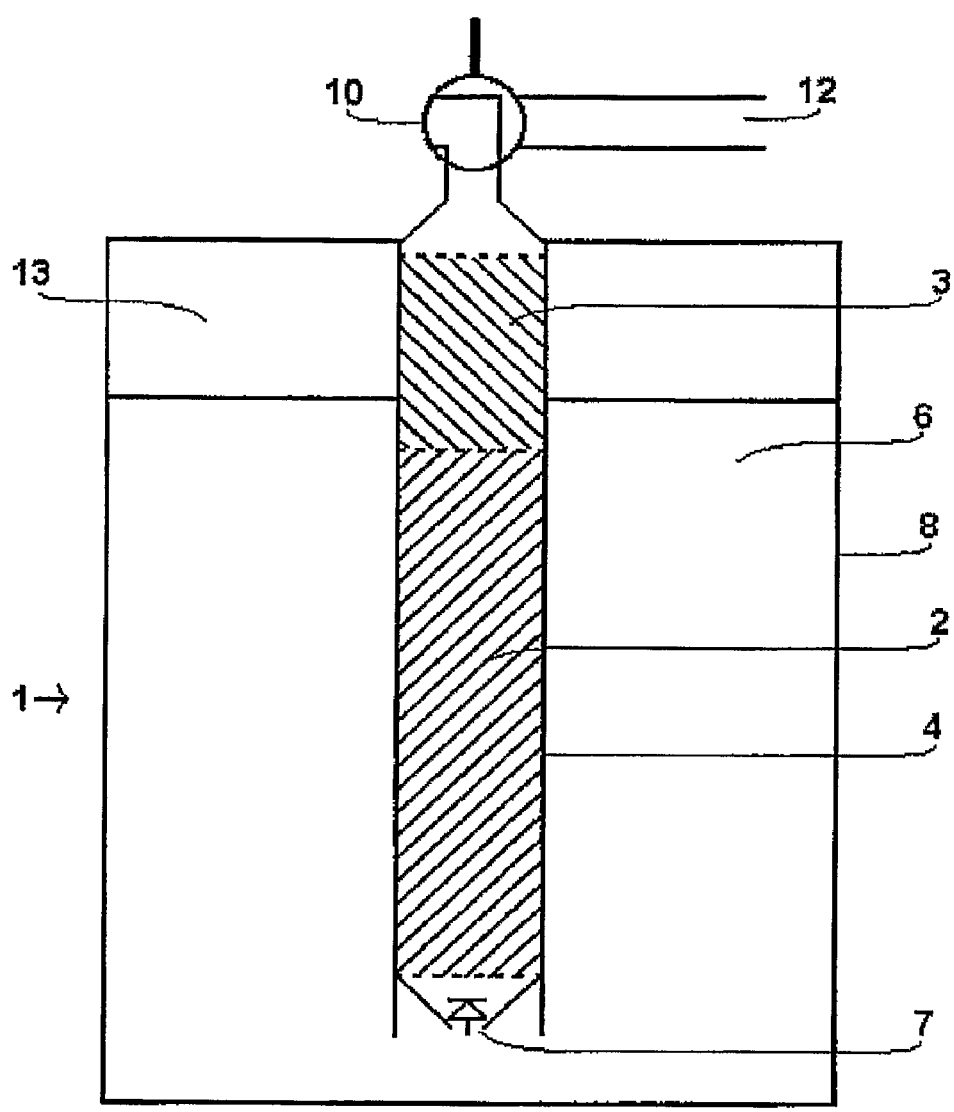
FIG. 1 shows a cross-section of a prototype on-demand chlorine dioxide sprayer according to an embodiment of the invention using a compressed gas for forcing.

An on-demand chlorine dioxide ($ClO_2$) generator 1 is illustrated in FIG. 1 and comprises a reactant bound medium 2 in a first enclosed volume 4, and a complementary reactant solution 6 in a second enclosed volume 8 isolated from the reactant medium 2. A structure 10 for selecting between a first position where said solution 6 is forced through said reactant bound medium 2 and a second position where said solution 6 remains isolated from said reactant medium 2 is provided, wherein $ClO_2$ (aq) is generated only during periods when said structure 10 for forcing is actuated resulting in the discharge of a $ClO_2$ containing solution through an outlet 12. As shown in FIG. 1, the structure for forcing includes a valve 10 which is shown in the second position for isolation and is actuated by rotating one quarter turn counterclockwise to the forcing position. In a preferred embodiment of the invention, the first and second enclosed volumes are themselves enclosed within a single common container.

Although the complementary reactant solution 6 is generally described herein as being directly incorporated into the generator 1, this complementary reactant solution 6 can be formed within the generator, where the reactant is stored as a solid or gas to enhance the shelf life of the generator under adverse storage conditions and including the solvent (e.g. water) in a third enclosed volume to generate the solution upon actuation of the structure for forcing to force the solvent into the reactant forming the solution immediately prior to its forcing into the ion exchange medium. It is preferable that all enclosed volumes are enclosed in a single common container although two or more containers that can be readily coupled are within the scope of the invention.

The invention provides for the convenient and efficient production of chlorine dioxide on-demand and in controlled amounts. Unlike one-shot devices based on membrane rupture of Kampa, devices according to the invention can dispense $ClO_2$ (aq) on-demand over multiple separate intervals of time, and can be configured to be refillable. Moreover, the invention can be easily adapted for portability In addition, although chlorine dioxide ($ClO_2$) generation using a solid medium is known, the invention represents the first portable on-demand chlorine dioxide ($ClO_2$) generator device using a solid medium. Although the $ClO_2$ (aq) product is highly corrosive, the Inventors have unexpectedly found that devices according to the invention operate reliably with standard fittings and no special storage protocol. Moreover, pressurization has surprisingly been found to produce reliable, significant and continuous $ClO_2$ (aq) product flow. As noted above, Sampson teaches gravity feed. The generator of this invention is designed to have a flow rate that delivers approximately 1 L of solution in less than 2 minute or even less than 1 minute. Furthermore the $ClO_2$ in solution will be present at a concentration of between 2 μM to 100 mM, and preferably from 1 mM to 50 mM to assure efficacy and safety.

Figure 2:
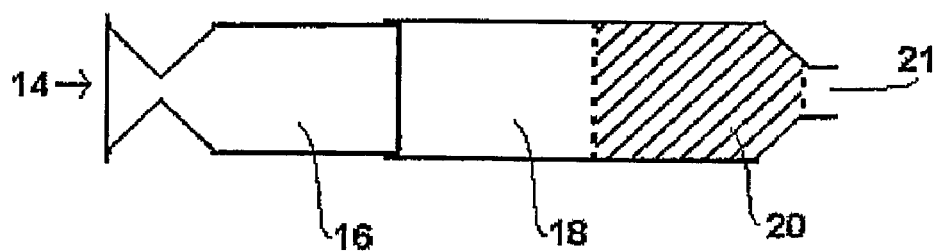
FIG. 2 shows a cross-section of an embodiment of the invention where the generator is in the form of a syringe.

The generator can be of different sizes and styles depending upon the nature of its use and the environment in which it is to be used. For example, as shown in FIG. 2, a very small generator can be a syringe styled unit 14 where the structure for forcing is a plunger 16 that is actuated manually by depression of the plunger 16 in to a syringe body to force the complementary regent solution 18 through a reagent bound medium 20 near the outlet 21 of the syringe 14. Such a generator may be used by soldiers or outdoorsman for water purification or other microbial decontamination in a remote environment. Such a syringe can be assembled immediately prior to use with a medium 20 and a solution 18 placed in the syringe generator immediately prior to use and stored separately. A pressurized apparatus can have the general appearance of a common hand held or cart mounted fire extinguisher as shown in FIG. 1. In this case a single container where a reagent bound medium 2 in one volume 4 is separated from a complementary reagent solution 6 in a second volume 8 where the apparatus is under a gas pressure 13 such that when, for example, a valve 10 is actuated the solution 6 under pressure is forced through the reagent bound medium 2 and discharged through outlet 12 into a fluid, onto a surface, or into the air to liberate a solution and the $ClO_2$ contained therein. In general, a check valve 7 is also included between the two volumes 4 and 8 as part of the structure for selecting between forcing and isolation. The pressure may be from a compressed gas 13 contained within the generator 1 or alternately supplied to the container from an attached gas canister. A pump may be used to supply a gas pressure needed for forcing the complementary reagent solution through the reagent bound medium. A liquid pump, such as a syringe, diaphragm, or peristaltic pump, may be used for forcing the solution through the medium. Pumps may be manually driven or mechanically driven with an available fixed power supply or a portable power supply such as a battery. The invention is not limited with respect to size, shape and modes of transport so long as the generator is portable. One of ordinary skill in the art can easily envision other structures for containment, actuation, and mobility.

The outlet for the discharge can be of a design such that a stream, a spray, or an aerosol of $ClO_2$ solution is discharged. For example, when purifying water a stream is generally sufficient to contact the $ClO_2$ solution and water, while the decontamination of a surface may be better served by a solution passing through a nozzle to give a fan or conical shaped spray. The formation of an aerosol at the point of discharge may be better suited for the decontamination of an enclosed space, such as a room, where the very high surface area of an aerosol can permit the rapid separation of the $ClO_2$ gas into the atmosphere which can diffuse through the relatively large volume of the room and decontaminate all surfaces including airborne particulates. Outlets, which are capable of generating an aerosol, are well known.

Although the invention is generally described herein as a chlorine dioxide generator, the scope of the invention is far broader. More generally, the invention relates to rapid and controlled generation of low stability solutions of an acidic, basic or near-neutral nature from inert salt precursor solutions using ion exchange resins or other modified solid supports. Thus, chlorine dioxide is one of many possible unstable reactive reagents that can be produced from stable precursors by this technology. For example, bromine dioxide can be generated via this technology.

The complementary reactant solution as described in the embodiments of the invention is an aqueous solution. However, it is within the scope of the invention to use solvents other than water and to use mixed solvents. The solvent can be various alcohols, glycols, ketones, aldehydes, ethers, amines, and even hydrocarbons. The solvent can be a combination of such organic chemicals and water in any proportions. Optionally, the solution can also include a surfactant. The surfactant can be ionic or non-ionic. The surfactant can be included to affect the efficiency of the reaction within the generator or used to enhance the effectiveness of the resulting $ClO_2$ solution at decontaminating surfaces.

The invention is based on a solid medium to which a reagent for the formation of chlorous acid or chlorine dioxide is bound. Such a medium can be clay, a silicate, an organic polymer, carbon or other structure onto which a reagent can be immobilized. In particular, polymeric resins, such as ion exchange resins and modified polymeric resins are preferred. Resins can be in the form of beads, pellets, or films. Useful polymeric resins include cross-linked polystyrenes, polyacrylates, or polymethacrylates which contain repeating units containing functional groups to bind a reagent. The functional groups for binding can include ions or ligands. The ions can be either cations or anions and act as a counterion to an anionic or cationic reagent, respectively. These ligands can be mono- bi- or polydentate. A ligand is one that is capable of forming a strong complex to a reagent such as a metal cation in a relatively high oxidation state.

For example, in one embodiment, a solid ion exchange medium can be in the form of an acidic ion exchange resin, the resin being functionalized to exchange hydrogen ions, $H^+$, for other cations in solutions (e.g. Dowex™ from Dow Chemical). This allows the convenience of passing a chlorite solution through the resin bed of the acid, thus converting chlorite to $HClO_2$ and leading to the rapid formation of $ClO_2$ (aq) as the solution emerges from the resin bed. Additionally, a basic mixed bead (acidic and basic) ion exchange resin, 3 of FIG. 1, may be used with the acidic ion exchange resin to permit discharge of a neutral stream of $ClO_2$ solution.

In reference to FIG. 1, the passage of a $NaClO_2$ solution 6 through an acidic ion exchange resin 2 forms a chlorine dioxide solution according to an embodiment of the invention. $Na^+$ exchanges with $H^+$ to produce $HClO_2$, which rapidly decomposes according to Equation 1.

$$5HClO_2 \rightarrow 4ClO_2 + HCl + 2H_2O \qquad \text{Equation 1}$$

The flow of the chlorite solution 6 into the solid acid resin 2 provides for intimate mixing of the acid with the chlorite in solution. Thus, there is no need for shaking or stirring as required by the Kampa system. An optional basic or mixed bead ion exchange resin 3 is also shown in FIG. 1. The resin 3 can neutralize the HCl byproduct generated by the reaction of Equation 1 above. Performing the two steps described above using traditional methods would require mixing three solutions in sequence, which is not easily accomplished in a single unit device.

The solid ion exchange resin provides several advantages over a conventional liquid acid source. The flow of the $NaClO_2$ solution through the resin bed provides for essentially instantaneous mixing of the reactants ($H^+$ and $ClO_2^-$). In addition, the solid resin is not corrosive, storage is easy, and the resin is highly chemically stable while dry.

Appropriately sized resin particles (such as used in water filtration systems, for example) can be used for the ion exchange resin. Typically these particles are spheres on the order of 500 microns, but can have different shapes or sizes, provided that liquid flow is possible at an acceptable rate.

In a preferred embodiment of the invention, the solid ion exchange medium can be in the form of an oxidant resin. An "oxidant resin" as defined herein is generally a material, composed of chemically modified polymer beads or the like, to which an oxidant agent (Ox) has been attached. Such a resin can be prepared by any number of methods in which oxidants are attached to a solid support that allows the ready flow of liquid through a column or other container packed with the support. The Ox can be selected from any variety of compounds, such as metal coordination complexes, and is generally referred to as "one electron oxidant." These are molecules that have the property of accepting one electron in chemical reactions. Other non-metallic oxidants can be used.

Figure 3:
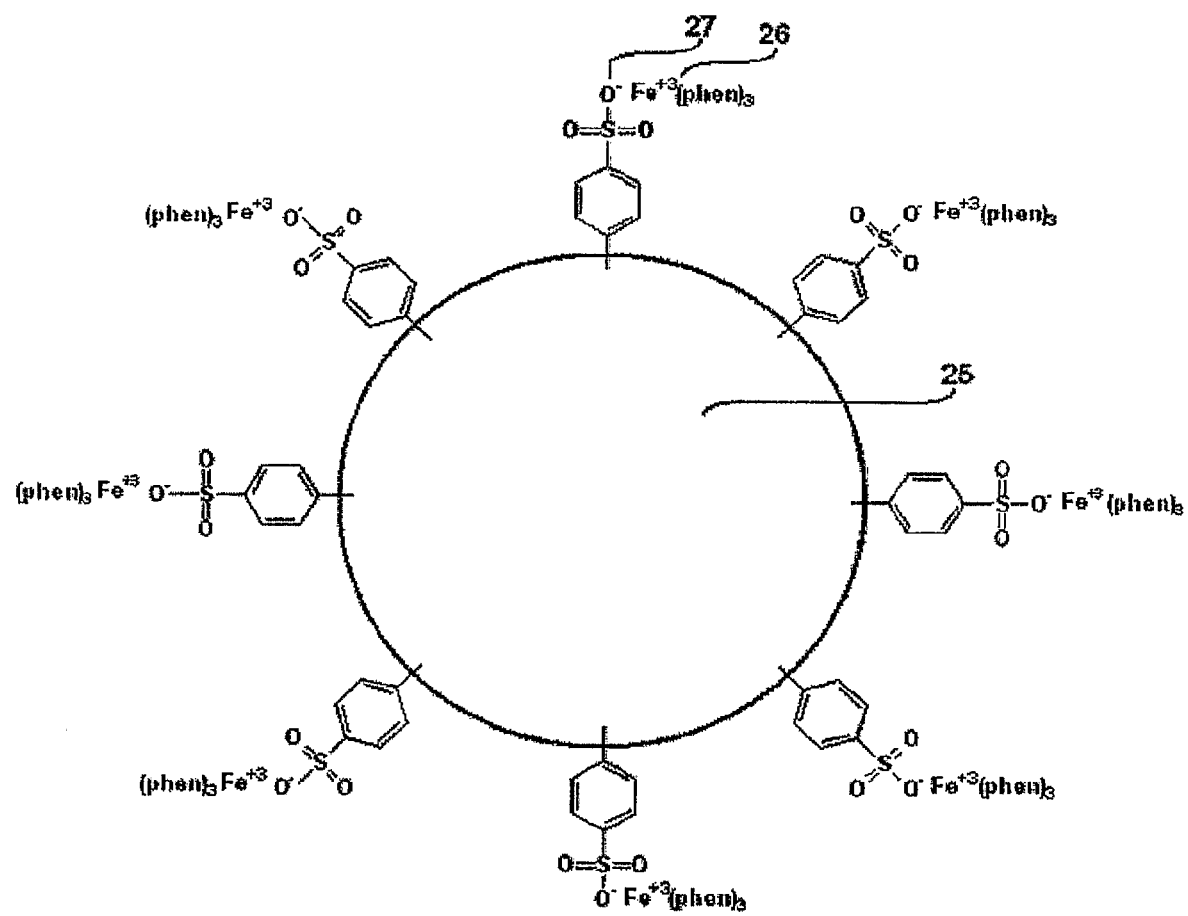
FIG. 3 shows a representation of an oxidant bound resin wherein an $Fe^{+3}$ oxidizer is bound to the resin via electrostatic attraction to an anionic resin.

As the chlorite solution passes through the oxidant resin, the Ox accepts an electron thus oxidizing the chlorite anion to $ClO_2$ as shown by Equation 2 below. A resin for this embodiment can be prepared by attaching an iron complex as the Ox to a resin. One exemplary oxidant resin is a cation ion exchange resin (Dowex) which has been treated with an aqueous solution of $Fe(phenanthroline)_3^{+2}$ to yield a resin with strongly electrostatically bound $Fe^{+2}$ ions followed by oxidation of the $Fe^{+2}$ to $Fe^{+3}$ upon contacting with an oxidant such as bromine water. This $Fe^{+3}$ modified resin, is illustrated in FIG. 3, where a resin bead 25 with covalently bound phenylsulfonate anions 27 immobilize $Fe(phenanthroline)_3^{+3}$ cations 26. Other anions, such as carboxylates, can be covalently bound to the resin and are in the scope of the invention. Additional anions are necessarily present to maintain the neutrality of the resin; these anions are not shown and will be other phenylsulfonate anions attached to the resin and/or free anions in solution. Any additional free anions within the resin's influence can have various valences, for example they can be monovalent or divalent, and their use is within the scope of the invention. The resin can be used to produce chlorine dioxide from chlorite according to the reaction above by passing a chlorite solution over the resin. This resin form of an oxidant reactant has a high surface area of the redox agent because of the large effective surface of the resin, which promotes a high yield of $ClO_2$. The oxidant resin can be made to be very stable during storage by choosing an appropriate oxidant and packing the resin in the generator in a dry form. This embodiment can also provide a near neutral pH (in the range of 5 to 9) to an eluting $ClO_2$ solution compared to the $ClO_2$ solutions produced using an acid ion exchange resin according to the invention, and thus the performance of a downstream neutralization step is not required to yield a near neutral pH $ClO_2$ solution when needed.

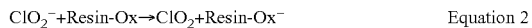

$$ClO_2^- + \text{Resin-Ox} \rightarrow ClO_2 + \text{Resin-Ox}^- \quad \text{Equation 2}$$

Figure 4:
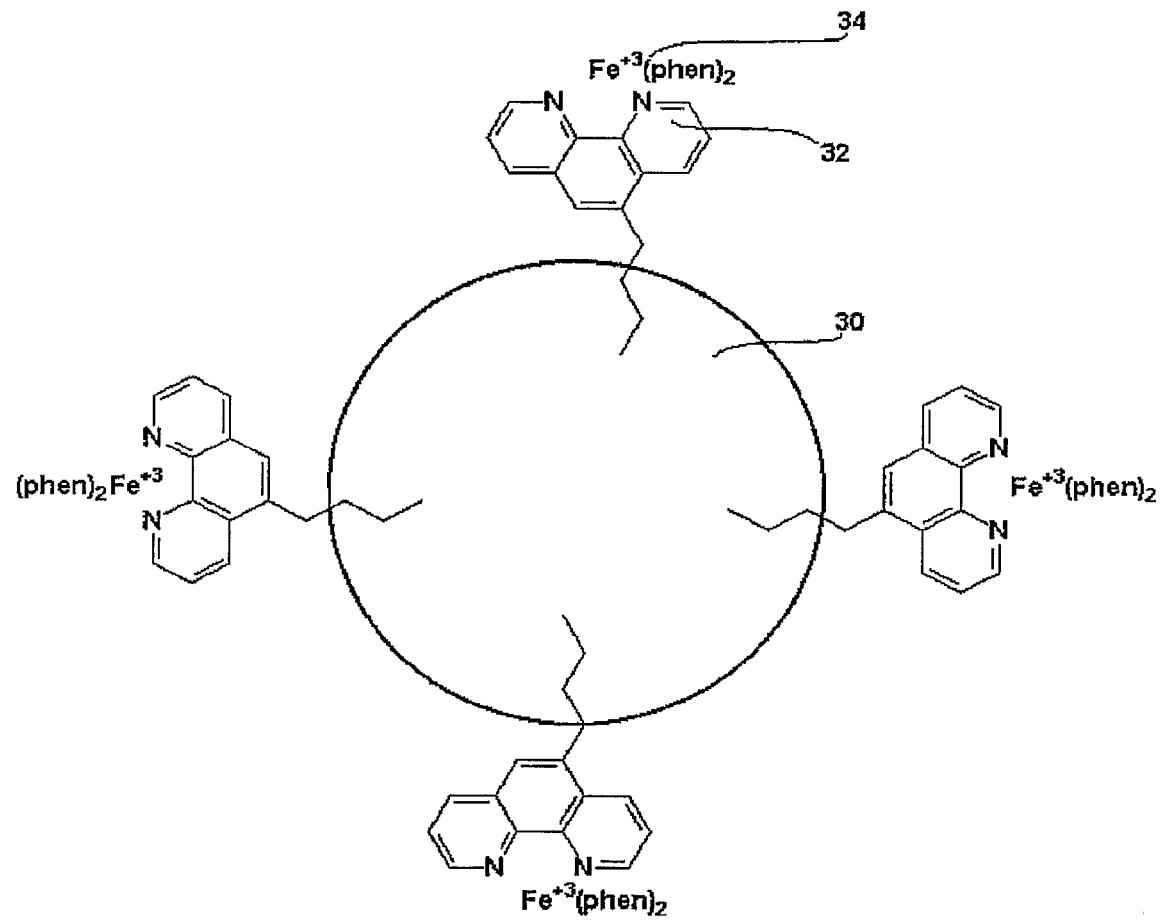
FIG. 4 shows a representation of an oxidant bound resin wherein an $Fe^{+3}$ oxidizer is bound to the resin via a bidentate ligand bound the resin according to another embodiment of the invention.

One variation of the oxidant bound resin is that where the resin contains a bound bidentate ligand such as a bound phenanthroline, as shown in FIG. 4, or bipyridine unit which can bind to a ferric ion or other oxidized metal ion capable of oxidizing chlorite ion to chlorine dioxide rather than being electrostatically bound as an exchangeable ion pair comprising a metal ion and an anionic site of the resin. For example, the resin portion of Resin-Ox of Equation 2 above can be a polystyrene resin bead 30 with attached phenanthroline ligand 32 and the Ox portion of Resin-Ox can be $Fe(phenanthroline)_2^{+3}$ 34. Upon reaction of this bound oxidant with sodium chlorite solution, the effluent can be a stream of $ClO_2$ in water with the Ox$^-$ portion of the co-produced Rein-Ox$^-$ in Equation 2 is $Fe(phenanthroline)_2^{+2}Na^+$. A mixed bead ion exchange resin, such as that commonly used for water purification, can be used downstream of the oxidant bound resin to assure a salt free aqueous solution of $ClO_2$. The advantage of such a system is the extremely high rates of reaction possible with such a resin. For example, where in the case using a resin bound $Fe(phenanthroline)_2^{+3}$, a rate constant of about $2\times10^7$ M$^{-1}$ s$^{-1}$ allows for on demand conversion of a chlorite solution to a chlorine dioxide solution.

Figure 5:
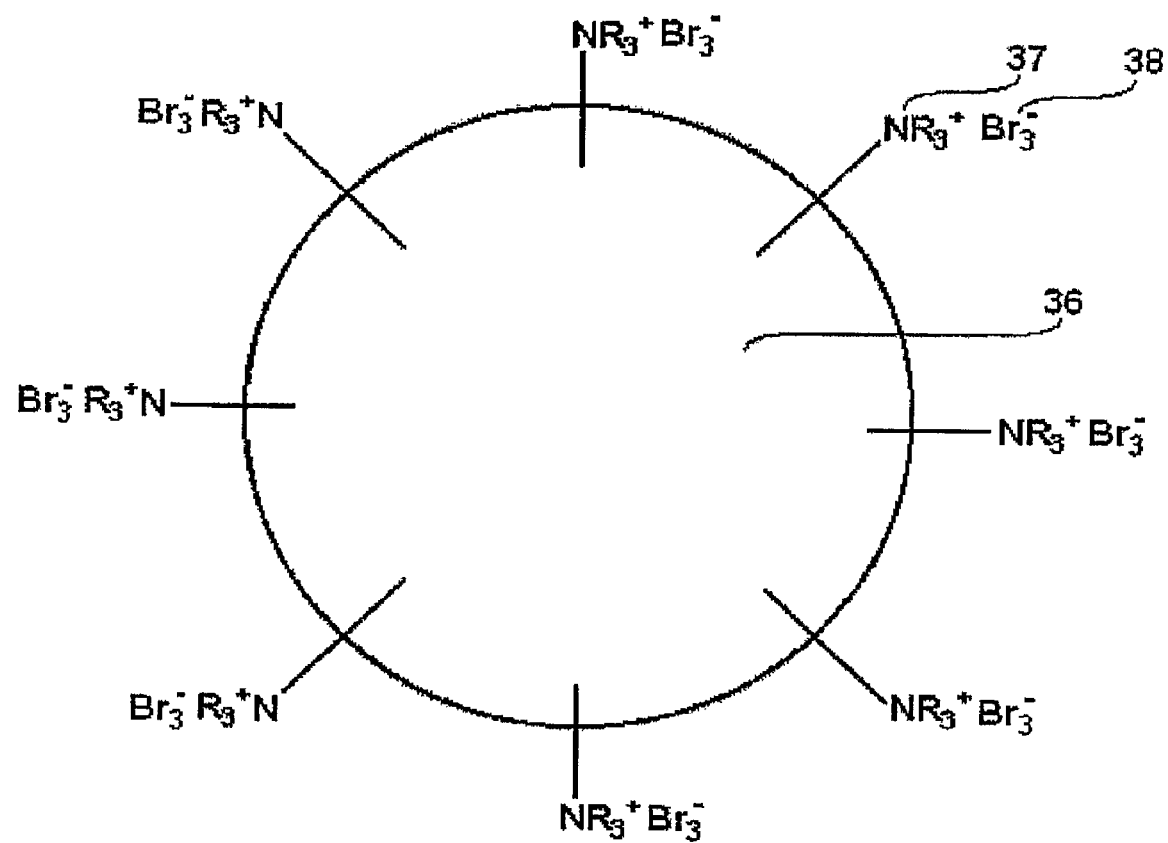
FIG. 5 shows a representation of an oxidant bound resin wherein a $Br_3^-$ oxidizer is bound to the resin via electrostatic attraction to a cationic resin.

A third variation for the Resin-Ox of Equation 2 is $Br_3^-$ bound to an ion exchange resin. Such a resin can be prepared by passing a bromine water solution through an anionic exchange resin with bound Br$^-$ ions. For example, an Amberlite™ anion exchange or resin in the OH$^-$ form was converted to the Cl$^-$ form with dilute hydrochloric acid and then to the Br$^-$ form using NaBr. All free Cl$^-$ and Br$^-$ ions were washed from the resin with deionized water. Saturated aqueous bromine at 0.20 M was diluted to 10 mM and slowly rinsed through the column until the resin was dark red with significant amounts of $Br_2$ in the effluent. The resin was then washed with water until the $Br_2$ content of the effluent was at a minimum. The tribromide resins, illustrated in FIG. 5, are stable in the dry and wet forms without significant loss of $Br_2$. FIG. 5 shows the resin bead 36 with covalently bound pendant trialkylamonium cations 37 electrostatically binding the $Br_3^-$ 38 anionic oxidant. In the presence of chlorite ion from a sodium chlorite solution, the equilibrium can be shifted to liberate $Br_2$, which converts two equivalents of $ClO_2^-$ to $ClO_2$ with the formation of two bromide ions. A mixed bed ion exchange resin can be used to scavenge NaBr from the effluent, allowing the discharge of a salt free aqueous $ClO_2$ solution.

Figure 6:
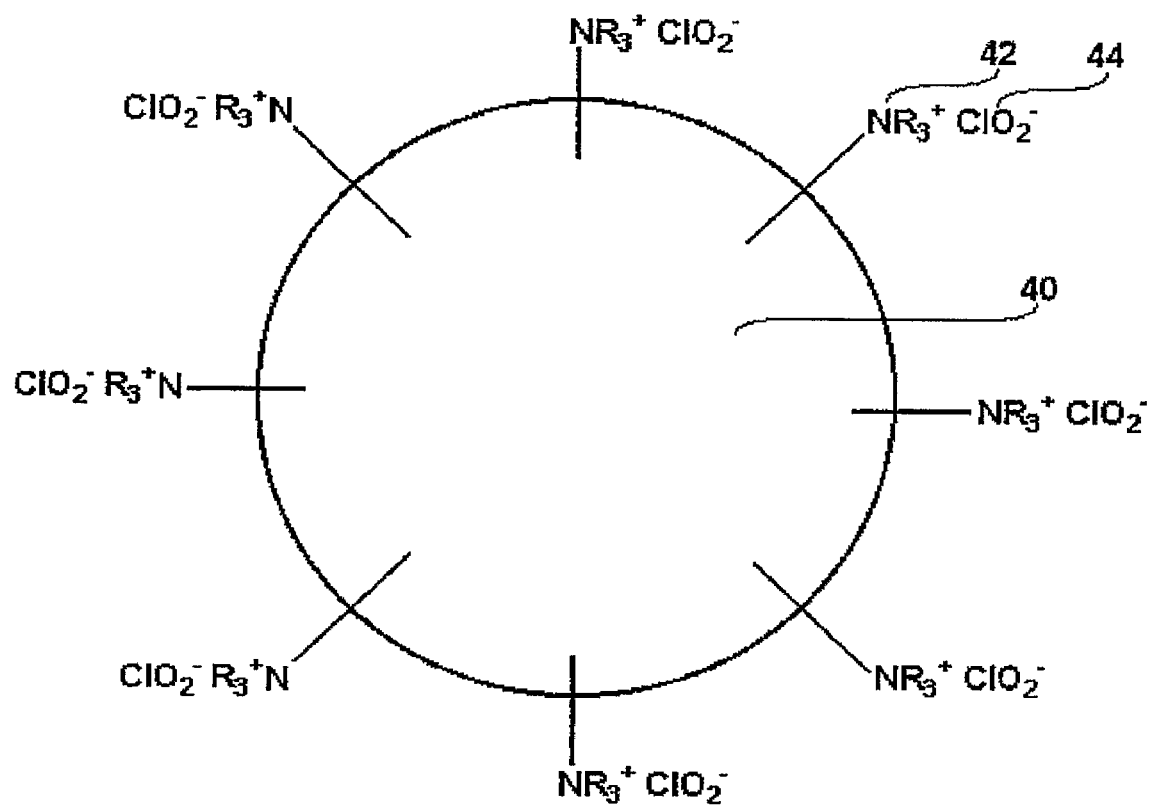
FIG. 6 shows a representation of a chlorite bound ion exchange resin according to another embodiment of the invention.

Another embodiment of the invention is based on a solid ion exchange medium upon which a chlorite ion is bound to the resin, as illustrated in FIG. 6. For example, the solid ion exchange medium can be prepared by exchanging chlorite ions in solutions, with an anion exchange resin commonly used in water treatment (e.g. Amberlite IRA 400™). These anion exchange resins 40 typically have covalently bound tetraalkylammonium ions 42 and are available with hydroxide or other anions, such as chloride, bound to the resin. The exposure of a soluble chlorite salt to the anion exchange resin, typically by passing the chlorite salt solution through a column of the resin, results in a chlorite 44 bound resin via the electrostatic attractions of the ion pair. This resin may be used in the wet state or a dry state.

The chlorite bound resin allows the passing of a mobile phase complementary reagent 6 comprising an aqueous solution of an acid through the chlorite bound resin bed 2, thus converting chlorite to $HClO_2$ and leading to the formation of $ClO_2$ (aq) as the solution emerges from the resin bed at outlet 12 as shown in FIG. 1. Equation 3, below, gives the reaction of the chlorite bound resin with an aqueous acid solution. Resin-$ClO_2$— represents the covalently bound tetraalkyllammonium chlorite sites of the resin. The anion attached after exchange and reaction is given as X$^-$ but, for example, can be Cl$^-$ where the HX exchanging with the resin is HCl. The rate of $ClO_2$ generation depends upon the pH of the acid solution. However, the use of a buffer solution as the aqueous acid solution can permit rapid formation of $ClO_2$ (aq) at pH buffers as high as about 5 such that a strong acid solution is not required. Weak acids, such as acetic acid and related organic carboxylic acids, are preferred but other organic acids, including organophosphoric and sulfonic acids, can be used. Mineral acids, such as hydrochloric and sulfuric acid, can also be adapted for use. Buffer solutions will typically be weak acid-conjugate base pairs, for example, acetic acid-sodium acetate solutions, with a buffer capacity of about 2 to about 5.

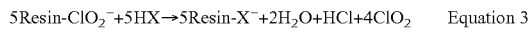
$$5\text{Resin-ClO}_2^- + 5\text{HX} \rightarrow 5\text{Resin-X}^- + 2\text{H}_2\text{O} + \text{HCl} + 4\text{ClO}_2 \qquad \text{Equation 3}$$

In yet another alternate embodiment, an oxidant can be included as the complimentary reactant in solution rather than an acid. The oxidant upon exposure to the chlorite bound resin can either directly oxidize resin bound chlorite with a neutral oxidant or oxidize chlorite that is exchanged off the resin with anions in the solution. The direct oxidation of resin bound chlorite has a significant kinetic requirement. In this case the redox reaction, Equation 4, must have a high rate constant to assure that significant conversion of chlorite to $ClO_2$ occurs in the bed, as the precursor solution can pass through the resin at a typical flow rate of about 10 to about 20 mL per second through a 2 cm diameter bed. This is a flow rate that is required to deliver approximately 1 L of solution in less than 2 minute to less than 1 minute.

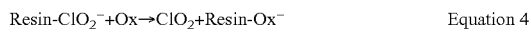
$$\text{Resin-ClO}_2^- + \text{Ox} \rightarrow \text{ClO}_2 + \text{Resin-Ox}^- \qquad \text{Equation 4}$$

Some oxidants that have very high rate constants including ionic metal complexes and neutral molecules such as $Br_2$ as indicated above for resin bound oxidants. For example, dry chlorite resin can be incorporated into a cartridge in a pressurized or pump operated spray device with an oxidant contained in a solution. Upon activating the sprayer, the solution passes through the resin bed and the $ClO_2$ forming reaction occurs, producing an effluent with strong oxidative and biocidal properties.

Oxidation of the chlorite ion exchanged from the resin permits slower oxidants and permits a wider choice of oxidants, since the $ClO_2$ production can occur in the effluent itself on a time scale of seconds to minutes. There are many oxidants that can be used to produce $ClO_2$ in the effluent. In addition, the operating pH range can be set using a buffer to a wide range of values from acidic to basic, with the specific pH range depending on the oxidant used.

Examples of oxidants that may be used include main group compounds such as chlorine, bromine, peroxides, and various related main group oxidants. Another class of oxidant that can be used is metal complexes, such as $Fe(phenanthroline)_3^{+3}$, which have very high one-electron reaction rates with chlorite. Other metal oxidants can carry out the generation of $ClO_2$ as given in Equation 4, above, but require acidic media to do so.

For example, 15 mL of chlorite-bound Amberlite exchange resin was treated repeatedly with bromine water (40 mL at a concentration of <10 mM). The effluent contained $ClO_2$ at the expected concentrations, and all the bromine was consumed when excess chlorite was available in the resin. The pH of a bromine water solution is between 3-4 due to the HOBr present at equilibrium. In this case, the reaction occurs in the resin bed itself and $ClO_2$ is produced immediately in the effluent solution. The pH of the product solution can be raised prior to dispersal by use of a second ion exchange resin cartridge incorporating a weak base such as bicarbonate, acetate or phosphate, a strong base such as hydroxide or a mixed bead. Commercially available weak base ion exchange resins based on resin bound tertiary amines can potentially react with the $ClO_2$ produced from the chlorite bound resin. Although these tertiary amine resins are not preferred for use in an apparatus where the parts are to be recycled and the resins are to be regenerated since resin degradation can occur upon standing after a discharge, the rate of amine oxidation is typically not significant with respect to the rate of $ClO_2$ generation in and dispensing from the device and, therefore, can be used in an embodiment of the invention.

When a volatile oxidant, such as bromine and chlorine, and volatile liquids are used in the practice of the invention, a check valve or breakseal is best included between the first volume and second volume as part of the structure for forcing to avoid diffusion of the gas or flow of liquids into the chlorite resin prior to the desired actuation and discharge. An alternate to storage of the volatile oxidant is to fix the oxidizer to a resin. For example, bromine reacts with bromide ions and is bound to an anionic exchange resin as $Br_3^-$ ions. The $Br_3^-$ ions is released from the resin by forcing a salt solution, for example aqueous NaBr, through the tribromide bound resin and subsequently passing the formed $Br_3^-$ solution through the chlorite bound resin upon switching the actuator into the forcing position. The $Br_3^-$ ion released by ion exchange with the salt is the oxidant in this embodiment.

The solid resin design according to the invention allows $ClO_2$ to be generated in a flow process that is readily adaptable to portable generators. FIG. 1 shows a prototype on-demand chlorine dioxide sprayer according to the invention, which resembles a conventional fire extinguisher in physical appearance. The spray device 1 provides both a reagent bound medium 2 and a basic ion exchange resin 3, and a complementary reagent solution 6. Spray device 1 includes an outlet 12 that can have a spray nozzle including spray valve 10. The resin 2 is isolated from the complementary reagent solution 6 by a conventional one-way flow or check valve 7 until it is time to dispense the solution. Pressurization or other standard techniques can be used to force the solution 6 through the resin 2 before it exits the sprayer as a $ClO_2$ solution upon actuating a valve 10. Although generally not preferred, a burstable membrane actuated by a pressure differential can be used to induce flow through the ion exchange medium.

The $ClO_2$ concentration, flow rate, physical properties, and the pH of the dispensed solution can be controlled by selection of the complementary reagent concentration in solution, the volume of reagent bound resin, pressures, and the inclusion of certain additives (e.g. acids, bases, salts, detergents and surfactants). Additives such as detergents and surfactants can improve the efficacy of the solutions produced and increase the activity of the oxidizing process by more rapidly wetting a dry resin.

The invention can be used to produce portable chlorine dioxide generators that have a long shelf life (e.g. several years) because reactive components are separated from one another. The use of solid reagent bound resin makes the two-reactant generator as simple to use as a single liquid sprayer, such as a fire extinguisher. The invention can be used to generate $ClO_2$ for many purposes including decontamination of surfaces, water purification, bio-medical sterilization, as well as decontamination of bio-terrorism and chemical agents.

There is a variety of applications for the invention as it is a convenient and reliable $ClO_2$ generator method. Military and homeland security uses are numerous for treating anthrax, other bioagents, and certain chemical agents. The military is presently searching for a replacement decontamination solution for use in portable sprayers for vehicle and ships. Water purification for camping and military use is also a potential application. Medical sterilization is another expected use of the invention. A portable $ClO_2$ device can also be used by first responders to suspected attacks in offices, buildings, subways and other sites.

It is to be understood that while the invention has been described in conjunction with the preferred specific embodiments thereof, the foregoing description is intended to illustrate and not limit the scope of the invention. Other aspects, advantages and modifications within the scope of the invention will be apparent to those skilled in the art to which the invention pertains.

We claim:

1. An on-demand $ClO_2$ generator, comprising:
   a solid reagent bound medium in a first enclosure situated within a first portion of a container, said first enclosure having an inlet and an outlet for discharging a $ClO_2$ solution;
   a complementary reagent solution in a second enclosure within a second portion of said container, wherein said second enclosure is situated upstream of said first enclosure, and wherein the complementary reagent solution is stored in isolation of said first enclosure until generation of said $ClO_2$ solution is demanded;
   a pressure source situated upstream of said second enclosure within said container; and
   at least one valve for selecting between a first position for storage where said first enclosure is isolated from said second enclosure and a second position for demanding where said complementary reagent solution from said second enclosure is forced under pressure through said inlet and through said reagent bound medium in said first enclosure, wherein said $ClO_2$ solution is generated and discharged through said outlet only during periods when said valves is in said second position.

2. The $ClO_2$ generator of claim 1, wherein said second enclosure and said first enclosure reside within said first portion and said second portion of said container.

3. The $ClO_2$ generator of claim 1, further comprising a basic or mixed bead ion exchange medium within said first enclosure said basic or mixed bead ion exchange medium being situated between said reagent bound medium and said outlet, wherein said $ClO_2$ solutions discharged through said outlet is near neutral in pH or salt free.

4. The $ClO_2$ generator of claim 1, wherein said pressure source comprises a plunger, a pump, or a compressed gas.

5. The $ClO_2$ generator of claim 1, wherein said at least one valves comprises a check-valve or a break-seal situated between said first enclosure and said second enclosure and a manual valve situated at said outlet.

6. The $ClO_2$ generator of claim 1, wherein said outlet further comprises a nozzle.

7. The $ClO_2$ generator of claim 1, wherein said complementary reagent solution contains a surfactant.

8. The $ClO_2$ generator of claim 1, wherein said reagent bound medium comprises an acidic ion exchange resin and said complementary reagent solution comprises a chlorite solution.

9. The $ClO_2$ generator of claim 1, wherein said reagent bound medium comprises an oxidant bound medium and the complementary reagent solution comprises a chlorite solution.

10. The $ClO_2$ generator of claim 9, wherein said oxidant bound medium comprises a metal complex bound medium.

11. The $ClO_2$ generator of claim 10, wherein said metal complex comprises a ferric salt complex.

12. The $ClO_2$ generator of claim 9, wherein said oxidant bound medium comprises a main group oxidant bound ion exchange resin.

13. The $ClO_2$ generator of claim 12, wherein said main group oxidant bound medium comprises a $Br_3^-$ bound ion exchange resin.

14. The $ClO_2$ generator of claim 1, wherein said reagent bound medium comprises a chlorite bound ion exchange medium and said complementary reagent solution comprises an acid solution.

15. The $ClO_2$ generator of claim 14, wherein said acid solution comprises an aqueous buffer solution of pH of about 3.5 to about 5 with a buffer capacity of about 2 to about 5.

16. The $ClO_2$ generator of claim 1, wherein said reagent bound medium comprises a chlorite bound ion exchange medium and said complementary reagent solution comprises an oxidant solution.

17. The $ClO_2$ generator of claim 16, wherein said oxidant solution comprises aqueous bromine or chlorine.

18. The $ClO_2$ generator of claim 16, wherein said oxidant solution is generated upon forcing a salt solution in a portion of said second enclosure through an oxidant bound medium in a second portion of said second enclosure situated immediately adjacent to said chlorite bound ion exchange medium in said first enclosure when said structure for forcing is actuated.

19. The $ClO_2$ generator of claim 18, wherein said oxidant bound ion exchange medium comprises a tribromide bound ion exchange medium.

20. A method of generating $ClO_2$ comprising the steps of:
    providing a solid reagent bound medium in a first enclosure having an inlet and an outlet within a container, a complementary reagent solution in a second enclosure upstream of said first enclosure within said container, a pressure source situated upstream of said second enclosure within said container, and at least one valve wherein said first and second enclosures are isolated from one another when said valve is in a first position;
    switching said valve to a second position for forcing said complementary reagent solution downstream from said second enclosure through said inlet and through said reagent bound medium in said first enclosure, wherein a $ClO_2$ solution is generated in said first enclosed volume; and
    discharging said $ClO_2$ solution through said outlet from said first enclosure.

21. The method of claim 20, wherein said reagent bound medium is an acidic ion exchange medium and said complementary reagent solution is a chlorite solution.

22. The method of claim 20, wherein said reagent bound medium is a chlorite bound ion exchange medium and said complementary reagent solution is an acid solution.

23. The method of claim 20, wherein said reagent bound medium is an oxidant bound ion exchange medium and said complementary reagent solution is a chlorite solution.

24. The method of claim 20, wherein said reagent bound medium is a chlorite bound ion exchange medium and said complementary reagent solution is an oxidant solution.

* * * * *

UNITED STATES PATENT AND TRADEMARK OFFICE
CERTIFICATE OF CORRECTION

| | | |
|---|---|---|
| PATENT NO. | : 7,964,138 B2 | Page 1 of 1 |
| APPLICATION NO. | : 12/095388 | |
| DATED | : June 21, 2011 | |
| INVENTOR(S) | : David E. Richardson et al. | |

It is certified that error appears in the above-identified patent and that said Letters Patent is hereby corrected as shown below:

On the title page;
Abstract,
Line 8, "ClO2 solution" should read --$ClO_2$ solution--.
Line 10, "ClO2 solution" should read --$ClO_2$ solution--.

Column 1,
Line 39, "In addition chlorine" should read --In addition, chlorine--.
Line 43, "being track mounted" should read --being truck mounted--.

Column 8,
Line 54, "Resin-ClO$_2$—represents" should read --Resin-$ClO_2^-$ represents--.

Column 11,
Line 27, "said valves is" should read --said valve is--.
Line 35, "$ClO_2$ solutions discharged" should read --$ClO_2$ solution discharged--.
Line 40, "valves comprises" should read --valve comprises--.

Signed and Sealed this
Twentieth Day of September, 2011

David J. Kappos
*Director of the United States Patent and Trademark Office*